United States Patent
Kappagantula et al.

(10) Patent No.: US 12,380,675 B2
(45) Date of Patent: Aug. 5, 2025

(54) COMPUTER VISION PROPERTY EVALUATION

(71) Applicant: Quantarium Group, LLC, Redmond, WA (US)

(72) Inventors: Vignesh Ram Nithin Kappagantula, Kirkland, WA (US); Andrei Aron, Woodinville, WA (US); Dominic Suciu, Edmonds, WA (US); Mihai Petriuc, Redmond, WA (US); John Smintina, Kirkland, WA (US); Clement Ifrim, Sammamish, WA (US); Malcolm Cannon, Seattle, WA (US); Petru Cociorva, Redmond, WA (US); Adrian Fanaru, Sammamish, WA (US)

(73) Assignee: Quantarium Group, LLC, Redmond, WA (US)

( * ) Notice: Subject to any disclaimer, the term of this patent is extended or adjusted under 35 U.S.C. 154(b) by 671 days.

(21) Appl. No.: 17/540,864

(22) Filed: Dec. 2, 2021

(65) Prior Publication Data

US 2023/0177808 A1 Jun. 8, 2023

(51) Int. Cl.
*G06T 7/00* (2017.01)
*G06F 18/214* (2023.01)
(Continued)

(52) U.S. Cl.
CPC .......... *G06V 10/764* (2022.01); *G06F 18/214* (2023.01); *G06N 3/045* (2023.01);
(Continued)

(58) Field of Classification Search
CPC ........... G06T 2207/20081; G06T 7/194; G06T 2207/20084; G06T 7/11; G06T 17/00; G06T 7/13; G06T 15/005; G06T 15/80; G06T 17/20; G06T 2207/30196; G06T 2210/41; G06T 7/12; G06T 7/70; G06T 7/10; G06T 7/136; G06T 7/174;
(Continued)

(56) References Cited

U.S. PATENT DOCUMENTS 10,430,902 B1    10/2019  Rawat et al.
2013/0080340 A1* 3/2013  Onmus-Baykal ...... G06Q 50/16
                                                    705/306

(Continued)

OTHER PUBLICATIONS

International Application No. PCT/US2022/080721, International Search Report, Written Opinion, 8 pages, Mar. 9, 2023.

*Primary Examiner* — Quan M Hua

(57) ABSTRACT

Systems and methods are disclosed for computer vision property evaluation. In certain embodiments, a method may comprise executing a computer vision property evaluation operation via a computing system. The computer vision property evaluation operation may include identifying an image of a selected property feature using a first neural network (NN) of the computing system, cropping the image of the selected property feature in a selected way to produce a cropped image using a second NN of the computing system, generating a categorization of the cropped image based on identified details of the selected property feature, and generating a classification of a property corresponding to the selected property feature based on the categorization.

20 Claims, 10 Drawing Sheets

(51) Int. Cl.
*G06N 3/045* (2023.01)
*G06Q 50/16* (2012.01)
*G06T 7/11* (2017.01)
*G06V 10/42* (2022.01)
*G06V 10/764* (2022.01)
*G06V 10/82* (2022.01)
*G06V 20/10* (2022.01)
*G06V 20/70* (2022.01)

(52) U.S. Cl.
CPC ............... *G06Q 50/16* (2013.01); *G06T 7/11* (2017.01); *G06V 10/42* (2022.01); *G06V 10/82* (2022.01); *G06V 20/176* (2022.01); *G06V 20/70* (2022.01); *G06T 2207/20081* (2013.01); *G06T 2207/20084* (2013.01); *G06T 2207/20132* (2013.01)

(58) Field of Classification Search
CPC ... G06T 7/60; G06T 7/90; G06T 11/60; G06T 15/04; G06T 15/60; G06T 2207/10004; G06T 2207/30244; G06T 7/0002; G06N 3/045; G06N 3/08; G06N 3/084; G06N 3/09; G06N 20/20; G06V 10/764; G06V 10/26; G06V 10/267; G06V 10/82; G06V 10/44; G06V 20/70; G06V 10/774; G06V 40/103; G06V 2201/07

See application file for complete search history.

(56) References Cited

U.S. PATENT DOCUMENTS

| | | | |
|---|---|---|---|
| 2016/0125645 A1* | 5/2016 | Khormi | G06T 17/05 382/103 |
| 2019/0294970 A1* | 9/2019 | Fidler | G06V 10/82 |
| 2021/0004589 A1* | 1/2021 | Turkelson | G06V 30/19173 |
| 2022/0044365 A1* | 2/2022 | Zhang | G06T 3/40 |
| 2023/0099570 A1* | 3/2023 | Bobert | G06Q 10/0635 345/633 |

* cited by examiner

COMPUTER VISION PROPERTY EVALUATION

SUMMARY

In certain embodiments, a method may comprise executing a computer vision property evaluation operation via a computing system. The computer vision property evaluation operation may include identifying an image of a selected property feature using a first neural network (NN) of the computing system, cropping the image of the selected property feature in a selected way to produce a cropped image using a second NN of the computing system, generating a categorization of the cropped image based on identified details of the selected property feature, and generating a classification of a property corresponding to the selected property feature based on the categorization.

In certain embodiments, a memory device may store instructions that, when executed, cause a processor to execute a computer vision property evaluation operation via a computing system, including identify an image of a selected property feature using a first neural network (NN) of the computing system, crop the image of the selected property feature in a selected way to produce a cropped image using a second NN of the computing system, generate a categorization of the cropped image based on identified details of the selected property feature, and generate a classification of a property corresponding to the selected property feature based on the categorization.

In certain embodiments, an apparatus may comprise a processor and a memory device storing instructions that cause the processor to identify an image of a selected property feature using a first neural network (NN), crop the image of the selected property feature in a selected way to produce a cropped image using a second NN, generate a categorization of the cropped image based on identified details of the selected property feature, and generate a classification of a property corresponding to the selected property feature based on the categorization.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
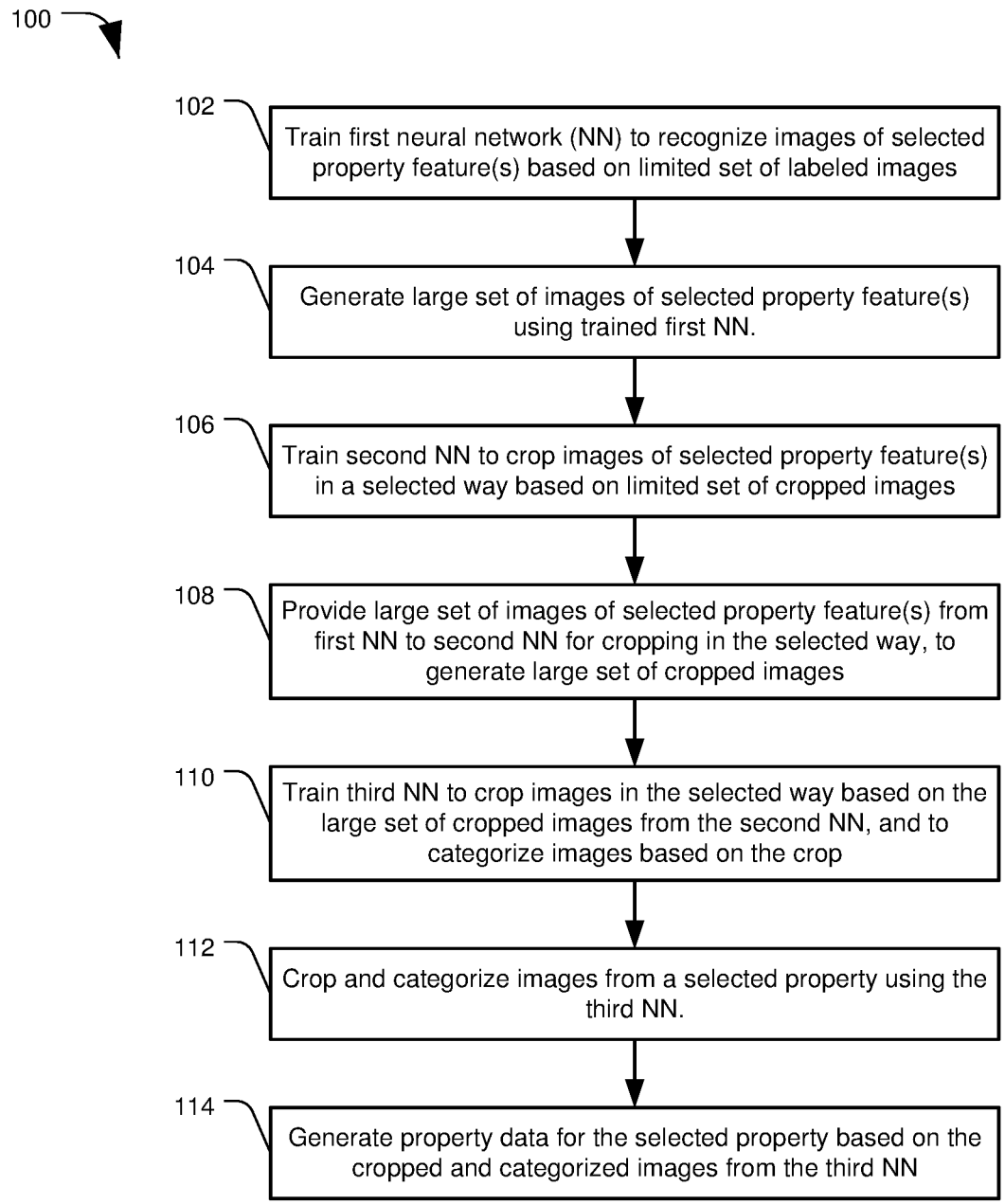
FIG. 1 depicts a flowchart of an example method for computer vision property evaluation, in accordance with certain embodiments of the present disclosure.

FIG. 1 depicts a flowchart 100 of an example method for computer vision property evaluation, in accordance with certain embodiments of the present disclosure. In particular, the method of FIG. 1 may present an example process for applying computer vision, machine learning, or both, to property images and data in order to generate property evaluations on a variety of metrics. Properties may include single family homes, apartments, retail spaces, empty lots, or other properties. A multitude of aspects of a property may be relevant when listing, valuing, or searching or considering properties for purchase or rental. Often times, property listing services such as MLS (multiple listing service) may provide basic details for a property, but may not include certain more specific property information that a user may consider relevant, such as how modern the fixtures are, details on natural lighting, views from a property, or other details. Real estate agents attempting to value a property may need to determine comparable properties using only limited information, such as geographic region and square footage, which may not provide the most relevant similar properties. Companies seeking to generate targeted advertising based on property details or individual property images may have limited options, particularly for properties that are not currently for sale or rent. Using combinations of computer vision and specialized machine learning training techniques, systems may be implemented to generate detailed property evaluations on a variety of property details, determine targeted comparable property lists, efficiently generate modified property images at scale, and perform other operations to improve technology for property listing and evaluation.

The example process outlined in FIG. 1 may be applied to provide improvements to property listing and evaluation in a variety of ways and contexts. The flowchart 100 may involve training a series of computer learning models, such as convolutional neural networks. Neural networks (NNs) and other deep learning systems may be computing systems configured to learn to identify features and patterns in data sets via a collection of connected artificial neurons, or nodes. Convolutional neural networks, as used here, can have a plurality of layers of nodes that can be used for evaluating an image. Bottom or initial layers may identify simple patterns or shapes, like edges. Slightly higher layers may look for combinations of the simple patterns, such as corners or crossed lines. Higher or deeper layers may detect more complex assemblages of shapes and patterns, such as tartan patterns and swirly lines. As the layers go on, the NN may start to identify more specific items, like eyes or ears or tails, e.g., if trained on images of dogs or cats, although the NN may not have awareness of what these items actually are. "Featurizing" images, or feature extraction, may include identifying elements based on recognizing features that make up the element (e.g., a rectangle may be recognized as an element having four corners and four edges). By running an image through a neural network and taking results from, e.g., a first and last layers, transfer learning can be implemented, which may refer to using a NN trained on specific examples of something (e.g., a kitchen faucet) to recognize similar objects. Rather than merely being trained to recognize individual objects, NNs may also be trained to recognize scenes or environments.

Once a NN has been trained to identify or recognize particular items, or in some examples herein, overall scenes or environments, the NN can be applied to unlabeled images to identify images having desired scenes, or to sort images based on what they depict. Additional training or additional NNs can allow for cropping images around scenes or objects of interest, and categorizing particular scenes or objects based on distinguishing features. In the context of property evaluation, the categorizations can be used to generate determinations about a feature, quality, or similarity of properties based on images alone, thereby obtaining data and details about properties that may not otherwise be listed or available for the purposes of searching, comparison, valuation, or other uses.

As stated herein, the NNs may be trained using a set of labeled or pre-modified data that teaches the NN what to look for or what operations to perform on data. Once trained, the NN can be provided with new or raw data, and make determinations and perform operations according to its training. The method of FIG. 1 may be implemented via a computer system, such as the systems illustrated in FIGS. 2 and 10.

The method may include training a first NN to recognize images of a selected property feature or features based on a limited set of labeled images, at 102. For example, the NN may be trained to recognize particular types of rooms (e.g., kitchens, bathrooms, living rooms, etc.) based on features that may commonly be found in those types of rooms (e.g., plumbing fixtures, cabinetry, furniture, fireplaces, etc.). In some examples, the NN may be trained to recognize images of the exterior front of a home, and potentially images that display the home with a selected degree of clarity (e.g., where most of the home front is not obscured by vegetation, etc.), occupying a selected amount of the total image (e.g., 30% of the image, rather than properties at a great distance), within a selected angle range (e.g., primarily showing a front of the property, rather than a side or rear), etc. The NN may be trained to recognize a "scene" rather than a particular object. A scene may refer to a view of a total space (e.g., a type of room, or an image with a home front framed in a particular way as described above), rather than focusing on a specific thing (e.g., a cat, or a car). The NN may be trained using a selection of labeled images, with labels such as "kitchen", "laundry room", or "home street view", enabling the NN to identify features or aspects of the labeled images that correlate to the selected property feature. The set of training images may be hand-labeled by a human user (e.g., through a computer program), provided from an image database of labeled images, provided from another NN trained to recognize and label images with the particular property feature, from another source, or combinations thereof.

At 104, the method may include generating a large set of images having the selected property feature or features using the trained first NN. For example, once the first NN has been trained using a limited selection of labeled images, the first NN may then be fed large amounts of unlabeled images. The trained first NN can select or identify images from the large unlabeled set that feature the selected property feature. For example, the first NN could process 100,000 raw images and generate an image set of the 7,000 images that contain the selected property feature.

At 106, the method may include training a second NN to crop images of selected property feature or features in a selected way, based on a limited set of training images (e.g., images having a pre-drawn box to indicate how the image should be cropped). "Cropping" may refer to discarding or deleting portions of an image outside of a selected crop region, obscuring images outside of the crop region (e.g., by drawing geometric patterns or "filling in" the image to hide or cover portions of the image outside of the crop box), or merely marking a crop box or generating crop box coordinates to delineate a boundary of what portion of a picture should be considered for further evaluation or image analysis. Cropping an image in a selected way can help a neural net focus on only one part of the total image when performing additional classification, and discard irrelevant parts of the image. This can enable the neural net to learn faster and better, using less training data. A crop box may comprise a square or rectangle that may be easier for NNs to process, although in some embodiments the crop box can take any shape. Distinguishing features of the image can be isolated while less important parts of the image may be discarded or ignored, thereby reducing the processing overhead needed for further evaluation or computer vision processing of the image. As an example, a training image set of kitchen images may be provided to the second NN, with the images having a box drawn in the selected way, such as enclosing a space from a top portion of the bottom cabinets to a bottom portion of the top cabinets. This example crop box may therefore include portions of both upper and lower cabinets, countertops, and kitchen fixtures located between the upper and lower cabinets. The second NN may accordingly learn the selected way to crop kitchen images, and can then crop raw images itself. In some embodiments, the second NN may be trained to learn to crop only one particular type of image of a selected property feature (e.g., kitchen images), while in other examples the second NN may learn different ways to crop images of different property features (e.g., crop kitchen images a first way, and crop living room images a second way). If a second NN is only trained to crop one type of image, then the second NN may encompass a plurality of different neural networks, each trained to crop images of different types of property features in selected ways.

The method may include providing the large set of images of the selected property feature(s) from the first NN (e.g., from 104) to the trained second NN for cropping in the selected way, to generate a large set of cropped images, at 108. For example, if the first NN generated a set of 7,000 kitchen images from a raw image set of 100,000 images, the second NN may crop the 7,000 kitchen images in the selected way to generate the large set of cropped images.

At 110, the method may include training a third NN to crop images in the selected way based on the large set of cropped images from the second NN, and to categorize images based on the cropped portion of the image. In some examples, the training images provided to the third NN may be cropped by the second NN and labeled by a user or another system or service. Labeling may be performed expeditiously on a pre-cropped image, while both cropping and labeling a large batch of images to generate sufficient training data may be prohibitively slow or expensive. In an example, based on the training data the third NN may be trained to both recognize a desired "scene", of what area of an image should be included within the crop box, and also to recognize and categorize specific features of the area within the crop box. Continuing with the example of kitchen images, the third NN may learn to capture the "scene" encompassing the space between a bottom portion of the upper cabinets and an upper portion of the bottom cabinets using a crop box. The training may be performed based on cropped images from the second NN that have been further labeled based on characteristics of the features within the crop box, based on a combination of unlabeled cropped images from the second NN and labeled images specifically focused on elements within the crop boxes, or on other combinations of training inputs.

The third NN may be trained to categorize scenes within the image in a variety of ways. In some examples, the NN may evaluate the scene (e.g., within the crop box) in a holistic manner, and make a broad categorization based on the scene as a whole. Such categorizations may produce determinations about, e.g., how updated a room is. A scene of a kitchen may be determined to be "updated" or "modern," "normal" or "average," and "outdated" or "old-fashioned," for example. In another example, the third NN may be trained to recognize different examples of specific elements within the scenes, such as cabinetry, countertops, and fixtures located within kitchen images. In some examples, there method may include employing multiple third NNs trained to evaluate or categorize images in different ways (e.g., holistically and based on individual elements within the scene), and the outputs of the multiple NNs can be used to make more precise evaluations of a property. When implementing multiple third NNs, some of them may operate on cropped images, while others may evaluate uncropped images. For example, a holistic-based third NN may only evaluate scenes within a crop box, while a third NN trained to recognize specific elements may evaluate the uncropped image.

The categorization performed by the third NN may include identifying which of several categories the image belongs to based on selected characteristics for those categories. The sorting characteristics may depend on a holistic evaluation of the entire scene compared to training images, or based on specific elements within the scene such as the style of the cabinets, countertops, or fixtures, the modernness of these elements, the cost (e.g., high-end or low-end) of the elements, or other characteristics. As with the second NN, the third NN may be trained to crop and categorize multiple types of images (e.g., from different rooms), or the third NN may comprise one or more NNs, each trained to crop and categorize a different type of image or property feature.

The method may include cropping and categorizing images from a selected property using the trained third NN, at 112. For example, the trained third NN may categorize images in bulk from one or more sources (e.g., such as property image or MLS databases, or appraisal or broker price opinion images), or it may receive user-submitted images from a single property, or may otherwise be applied to categorize or evaluate property images based on the training. At 114, the method may include generating property data for the selected property based on the cropped and categorized images from the third NN. For example, the third NN may be trained to categorize images into a plurality of different groups, and a computer program may be able to recognize the categories and assign one or more labels or property data outputs based on the categorization. In one embodiment, a property listing from MLS or another property site may be submitted to the third NN, for example via a web interface. The third NN may perform cropping and categorization on one or more property images from the listing. Based on the categorization, a computer system or software may determine that the kitchen for the property is modern or updated, and possibly determine that the kitchen includes shaker-style cabinets, granite countertops, and chrome plumbing fixtures. This data may be used to automatically update property listings for large numbers of properties without manual supervision or verification. Alternately, the NN system may be applied to search through and categorize property listings based on included images, and to provide an output of property listing matching user-specified search criteria. Other applications are also possible. FIGS. 4-9 depict flowcharts of various specific methods of applying the general framework process outlined in FIG. 1. An example system configured for implementing computer vision property evaluation is described in regard to FIG. 2.

Figure 2:
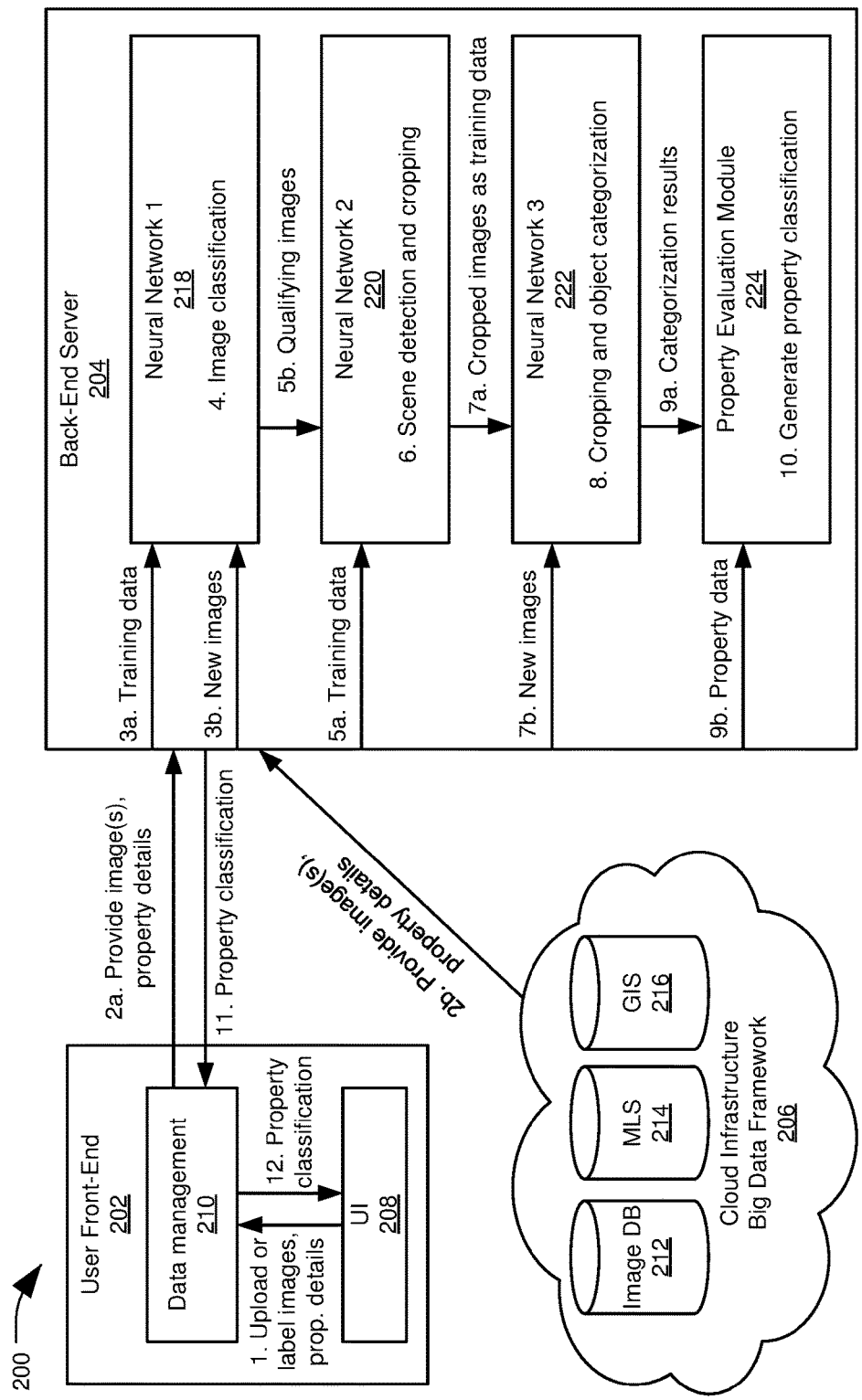
FIG. 2 is a diagram of a system configured for computer vision property evaluation, in accordance with certain embodiments of the present disclosure.

FIG. 2 is a diagram of a system 200 configured for computer vision property evaluation, in accordance with certain embodiments of the present disclosure. In particular, system 200 provides an example set of elements for implementing computer vision property evaluation at a user device. System 200 may include a user front-end device 202, a back-end server 204, and a cloud infrastructure big data framework 206. One or more components of system 200 may implement the methods described in regard to FIGS. 1 and 3-10.

User front-end 202 may be a computing device, such as a desktop computer, laptop computer, smart phone, tablet, set top box, or other device. User front-end 202 may also be a software-based interface, such as software installed on a user computer or accessed via a web-based interface, or the user front-end 202 may be a combination of computing system and software. User front-end 202 may be implemented on a system having one or more memories, processors, executable instructions, and other modules configured for executing operations related to implementing or interfacing with computer vision-based neural networks or machine learning systems, as described herein. User interface components of user front-end 202 may include a display device, touchscreen, pointer device, keyboard, other user interface elements, or any combination thereof. User front-end 202 may have a communication interface for communicating with remote devices, such as via wired or wireless internet, cellular connectivity, or other methods. Via the user input communication systems, the user front-end 202 may receive commands and inputs from a user, exchange data with remote systems such as back-end server 204, and display data and results to a user.

User front-end 202 may include a user interface (UI) module 208 and a data management module 210. UI module 208 may include the user interface components described above, such as displays and pointer devices, as well as code or executable instructions for presenting a graphical display (sometimes called a graphical user interface, GUI) on a screen via which a user may input data or review data. User inputs received at user front-end 202 may also be received by UI module 208, and information from user inputs may be communicated from UI 208 to back-end server 204 via the data management module 210. For example, a user may utilize the UI module 208 to input property queries (e.g., searching for properties having selected characteristics), upload photographs of properties for evaluation, enter data regarding properties (e.g., address or other information), enter or submit other information, or to review search results or property evaluations received from back-end server 204 via data management module 210.

Data management module 210 may coordinate data transmission and receipt between user front-end 202 and outside systems, such as back-end server 204 and cloud infrastructure 206. For example, the data management module 210 may format data received from UI module 208 into data packets formatted for transmission over the internet, or receive and unpack internet data packets. Data management module 210 may communicate with UI module 208 for receiving user inputs, and formatting data for display on a GUI element of UI module 208.

Cloud infrastructure 206 may include a big data framework, which may store large quantities of data including MLS and other property-listing databases 214, geographic information system (GIS) and other geography databases 216, and databases 212 having property images, building and parcel locations, images from satellite photography and street-level recordings, other property or geography resources, or any combination thereof. Data from cloud infrastructure 206 may be accessed by remote systems via general internet queries and addresses, platform-specific application program interface (API) calls, or via other methods. For example, user front-end 202 may be used to upload property photographs and data to a cloud-based database, and back-end server 204 may access data from cloud infrastructure 206 to incorporate into computer vision property evaluation routines and processes.

Back-end server 204 may include one or more computing systems configured to execute computer vision-based machine learning neural network systems and algorithms, including training and application of the systems to generate property evaluations. Back-end server 204 may be configured to retrieve, store, and process data associated with computer-vision based property evaluations. One or more processing systems, cache memories, local file systems, and communication interfaces may be included in back-end server 204. The communication interfaces may enable communication with other devices over a network, such as user front-end system 202 or cloud infrastructure 206.

Back-end server 204 may include or implement a neural network (NN) 1 218, NN2 220, NN3 222, and property evaluation module 224. NN1 218 may be configured or trained to perform image classification by recognizing a selected scene. As described herein, NN1 218 may recognize a scene comprising a particular type of room or arrangement of features (e.g., architectural features, interior layout, exterior images meeting certain criteria, etc.), rather than merely recognizing a selected object or item, although in some examples particular objects may be used to help identify the selected scene. NN2 220 may be configured or trained to crop selected types of images in a particular or selected way, for example by isolating features of particular interest within the scene for the purposes of property evaluation. NN3 222 may be configured or trained to crop images in the selected way as in NN2 220, and to categorize the images or objects within the crop. Based on the categorization results from NN3 222, and in some examples other data about the subject property, the property evaluation module 224 may generate property classification or evaluation data. The property evaluation data may be provided to user front-end 202 in some examples. The property evaluation module 224 may also be configured to provide data to NNs 1-3 for purposes of training, performing bulk property evaluations, or other operations, either automatically or based on user input.

In an example operational process flow for system 200, user front-end 202 may receive data via UI 208, such uploaded images, image labels, or other property details (e.g., address, coordinates, square footage, etc.), at step 1. Data management module 210 may convert the data into another format, such as placing the data into packets for transmission, and provide the data from user front-end 202 to back-end server 204, at step 2a. Back-end server 204 may also receive or retrieve property data (e.g., images, property details) from cloud infrastructure 206, at step 2b.

At step 3a, training data may be provided to NN1 218 to teach the NN1 what type of images to "accept" or pass on, and which types of images to "reject". The training data may include labeled images including a desired type of scene, where the NN1 218 may learn to identify images of the desired type of scene based on characteristics of the labeled images. In some examples, NN1 218 may learn to distinguish between multiple types of scenes (e.g., different types of properties or rooms), rather than merely accepting or rejecting images. The training data may be provided or labeled via user front-end 202, or may be provided (pre-labeled or otherwise) from a resource of cloud infrastructure 206. At step 3b, a trained NN1 218 may be provided with one or more new, non-labeled images, and NN1 218 may accept or reject the images, or categorize the images, based on its training. For example, a large quantity of new images may be provided to NN1 218 from a property images database 212 of cloud infrastructure 206. At step 4, NN1 218 may perform image classification to determine whether received images are to be accepted or rejected, or classified or sorted into different groups.

NN2 220 may be provided training data regarding how to crop particular types of images (such as those including scenes identified by NN1 218), at step 5a. These may include images labeled with pre-drawn crop boxes, which may be used to train NN2 220 where and how to position or draw crop boxes on unlabeled images. At step 5b, NN2 220 may receive "accepted" or qualifying images from NN1 218, potentially in bulk quantity. The images from NN1 218 may not be labeled, but may be pre-filtered to only include images of a selected view so that NN2 220 does not need to determine whether an image includes the selected view before cropping it, and can instead crop all images received by NN2. At step 6, NN2 220 may identify a scene or area within an image to crop according to its training, and crop the image. Cropping may include merely drawing a box around a selected area of the image, or may include cutting off portions of the image outside of the selected crop area. In some examples, cropping an image may include drawing geometric shapes over, or otherwise obscuring or covering, areas of the image outside of the selected crop area, potentially by interfacing with another program or system which may use coordinates from NN2 220 to actually perform the cropping or obscuring.

At step 7a, training data in the form of pre-cropped images may be provided to NN3 222, such as from NN2 220. For example, the crop-boxes drawn by NN2 220 may act as training indicia to teach NN3 222 how and where to draw crop boxes on images. The pre-cropped images may be further labeled, such as by a user or other system or service, to teach NN3 222 to perform categorization of objects or scenes within the crop window. NN3 222 may receive new images (e.g., images not having cropping or labeling) at step 7b. The images may be pre-screened, such as by NN1 218, so that only images of the correct type of scene are passed to NN3. For example, images submitted by users (e.g., via user front-end 202) or obtained from an image database (e.g., image DB 212 of cloud infrastructure 206) may be evaluated by NN1 218 to identify images of "kitchens", for example, and only the kitchen images may be provided to a NN3 222 trained to crop and evaluate kitchen images. At step 8, NN3 222 may perform cropping and object categorization of the new images according to its training. Categorization may include determining a holistic evaluation for the scene or identifying specific elements within a scene, such as a style of property fixtures, a style of architecture, identifying signs of modernness or age of property, identifying features of a view through a window or exterior image, identifying signs of neighborhood affluence, other categorization determinations, or a combination thereof. As previously described, NN3 222 may comprise a plurality of NNs trained to categorize images in different ways.

Step 9a may include providing categorization results from NN3 222 to property evaluation module 224. Property evaluation module 224 may also receive additional property data at step 9b, such as address or coordinates, GIS data 216, square footage information, listings of other properties for comparison, other property data, or a combination thereof. Based on the categorization data and any relevant additional property data, the property evaluation module 224 may generate property classification or evaluation results, at step 10. These results may be regarding a variety of property features, such as how updated fixtures or appliances are, a degree of openness of a floorplan, an amount of natural lighting, a categorization of views from a property, other property evaluations, or a combination thereof. The property classification or evaluation results may be provided to user front-end 202, at step 11. Data management module 210 may unpack the received property classification information, and may format and display it via UI 208, at step 12. In some examples, the property classification or evaluation results may be provided to other systems, such as an automated valuation model, added to an entry for the property for finding comparable properties in an appraisal software, uploaded to a corresponding property listing of MLS 214 in cloud infrastructure 206.

Once the NNs 218-222 have been trained, the operational flow of processing new images may adjust to exclude one or more NNs, such as NN2 220. For example, once NN3 222 is trained to crop images, NN2 220 may not provide additional utility. Accordingly, new images may be processed by NN1 218 to identify appropriate scenes, cropped and categorized by NN3 222, and a property classification or evaluation may be performed by property evaluation module 224. In some examples, the output of NN3 222 may comprise the property classification data, and there may not be a need for a separate property evaluation module 224, or the property evaluation module 224 may be used simply to provide the classification results as an output to user devices, the cloud 206, memory devices, or other systems.

A number of example applications of the computer vision property evaluation methods and systems of FIGS. 1 and 2 are discussed in regard to the following figures. In the following methods, certain steps are excluded for brevity, such as elements 104, 108, and 112 of FIG. 1, but those can be considered as optionally included within the following methods when such inclusion would be appropriate.

Figure 3:
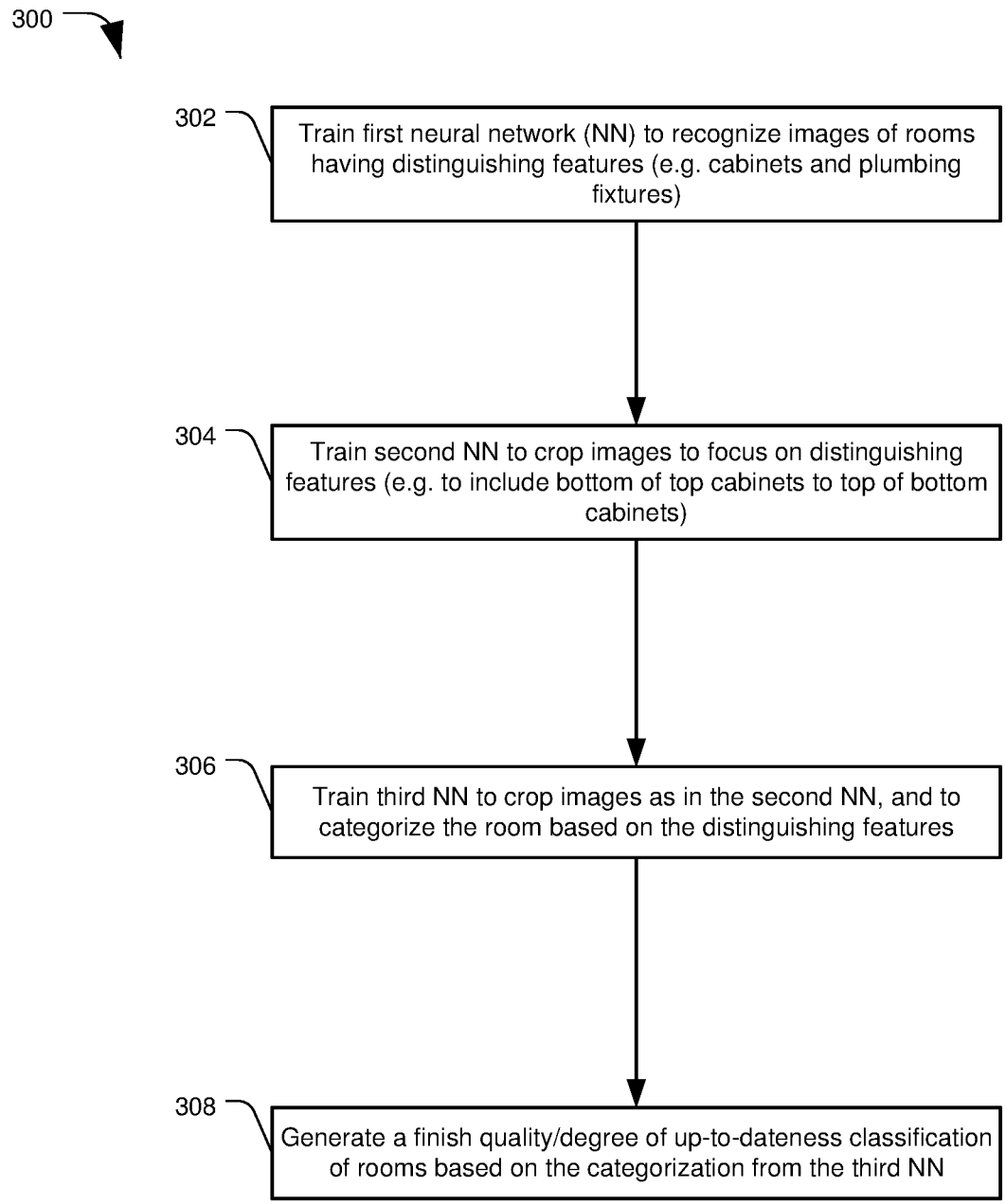
FIG. 3 depicts a flowchart of an example method for computer vision property evaluation, in accordance with certain embodiments of the present disclosure.

FIG. 3 depicts a flowchart 300 of an example method for computer vision property evaluation, in accordance with certain embodiments of the present disclosure. In particular, flowchart 300 provides an example process for training and applying computer vision-based neural networks to evaluate a finish quality or how updated a type of room is based on selective cropping of images of that room. The method of FIG. 3 may be implemented via systems and computing devices such as those depicted in FIG. 2 and FIG. 10.

Running a basic computer vision classifier on images of rooms such as kitchens or bathrooms may have two problems: 1) basic classifiers may operate on low-resolution images (e.g. 256×256 pixels), and 2) images may be heterogeneous in terms of view-angle and which room features or objects are visible. Using an object detector algorithm instead or in addition allows high-resolution evaluation of an image, as well as labeling and rating the most interesting room features: e.g., countertops, including bottoms of upper cabinets and tops of lower cabinets in kitchens; vanity including the space up to the mirror and the upper part of the lower cabinets for bathrooms, or similar features for other rooms. Such high-resolution evaluation of room features may allow for making more detailed conclusions or evaluations on differences between features in different rooms or images. Configuring different types of neural network systems and algorithms to work together to evaluate images can provide significant improvements in computer vision based property evaluation. Accordingly, a first NN may be trained in vision classification, while a second and third NN may be trained in object detection. For example, the first NN may be trained to identify particular types of rooms or scenes (potentially using a low-resolution version of an image), while the second NN may be trained to recognize a particular aspect or feature of a scene (potentially using a high-resolution version of the image) identified by NN1, and crop the image based on the recognized aspect. NN3 may be trained to crop an image based on NN2's training, and to recognize or categorize more particular characteristics of the aspect or feature within the crop (again potentially using a high-resolution version of the image).

Accordingly, the method may include training a first NN to recognize images of rooms having particular distinguishing features, at 302. Distinguishing features may include kitchen fixtures such as cabinets, appliances, and plumbing fixtures to identify images of a kitchen, or bathroom fixtures such as vanity cabinets, plumbing fixtures, and mirrors or medicine cabinets to identify images of a bathroom. In another example, furniture or features such as couches, entertainment centers, fireplace mantles, and exterior doors may distinguish images of living rooms. In some embodiments, the first NN may be trained to only recognize images of one particular type of room, while in other embodiments the first NN may be able to distinguish between and categorize images of multiple different types of rooms. The first NN may also comprise a set or sequence of NNs, with each trained to identify one or more kinds of rooms. For example, multiple classifiers or NN1's might be utilized if there are different datasets: for instance, MLS images tend to be different in content and quality from appraisal images. Appraisal images, for instance, may include "address verification" photos of the house number, which may be absent in MLS. The quality or characteristics of the images may also be different: e.g., MLS living rooms tend to be wide-angle, high resolution, and consistent in framing. In contrast, appraisal living rooms tend to be low angle and resolution, and less consistent in composition. Each vertical may therefore have its own classifier, with the set of classes each classifier recognizes being different. However, a single classifier may still be trained to work with all the photos, regardless of source or characteristics.

At 304, the method may include training a second NN to crop images to focus on distinguishing features of the type of room(s) identified in 302. For an example of kitchen images, the second NN may be trained to crop an image with a box spanning from a bottom portion of a top set of cabinets (e.g. overhead cabinets) to a top portion of a lower set of cabinets. Such a crop may encompass identifying features of the cabinet doors, trip or molding, countertops, and plumbing fixtures such as sinks. A similar approach may be applied to bathroom images. A single room may include multiple distinguishing features, which may be spread across multiple images. For example, a bathroom may include the vanity area, as well as one or more images of a shower or tub area. Images of different portions of a same room may be cropped in different ways, to capture most relevant details from the image while excluding less relevant portions of the image.

A third NN may be trained to crop images as performed by the second NN, and to further categorize the image or room based on the distinguishing features or the whole scene inside the crop box, at 306. As described above, categorization may include evaluating the scene holistically, to generate an overall evaluation of how updated a room in, a quality of finish for a room, or other aspects based on similar images in the training data. In another example, categorization may include recognizing and evaluating one or more particular aspects of a scenes, including a style of fixtures such as cabinets, a type of countertop, a quality or style of plumbing fixtures, a modernness of updates (e.g., based on style and design of cabinets, plumbing fixtures, tiling, etc.), or other features. Once trained, the third NN may receive new raw images, crop them, and categorize features within the crop.

At 308, the method may include generating a finish quality or a degree of up-to-dateness classification of a room based on the categorization from the third NN. For example, the third NN may output an up-to-dateness or finish quality determination directly (e.g., "modern" or "outdated"), such as based on a holistic evaluation of the scene, and no additional classification may need to be performed for the room. In some embodiments, the third NN could classify an image based on a determined style of cabinets, a style of backsplash finish, and a style of plumbing fixtures. From these categorizations, an evaluation for the room may be made based on comparing those feature styles to, e.g., a database or table relating styles to levels of quality or up-to-dateness. If multiple features are evaluated, an algorithm for producing an overall evaluation for the room may be applied, such as by equal averaging of different aspects, or weighted valuations (e.g., valuing cabinets and countertops higher than plumbing fixtures). A holistic evaluation of a scene may be used along with evaluations of specific features in the scene to generate an overall classification. In some examples, the third NN (or another system based on the categorizations from the NN) can produce one or more vectors for the image (e.g., data objects having values for multiple elements), and those vectors can be used to assign a rating or evaluation to the subject room.

For this and other methods discussed herein, the pictures categorized by the third NN may be user uploaded (e.g., uploaded by a user directly to the computer vision property evaluation system to receive an evaluation for the uploaded pictures), or may be retrieved or received from other sources, such as MLS listings or other property image databases. Property photographs from professional or official property listing sources like MLS are often generally homogeneous in composition (e.g., what is shown for different room types, from which angles, with wide-angle photography, etc.), while images from individual users may be more heterogeneous, and therefor may be more difficult for a NN to recognize. NNs configured to process user-submitted photos may be specially hardened, or receive additional or specialized training, to recognize scenes and crop zones in the potentially more varied photos.

Figure 4:
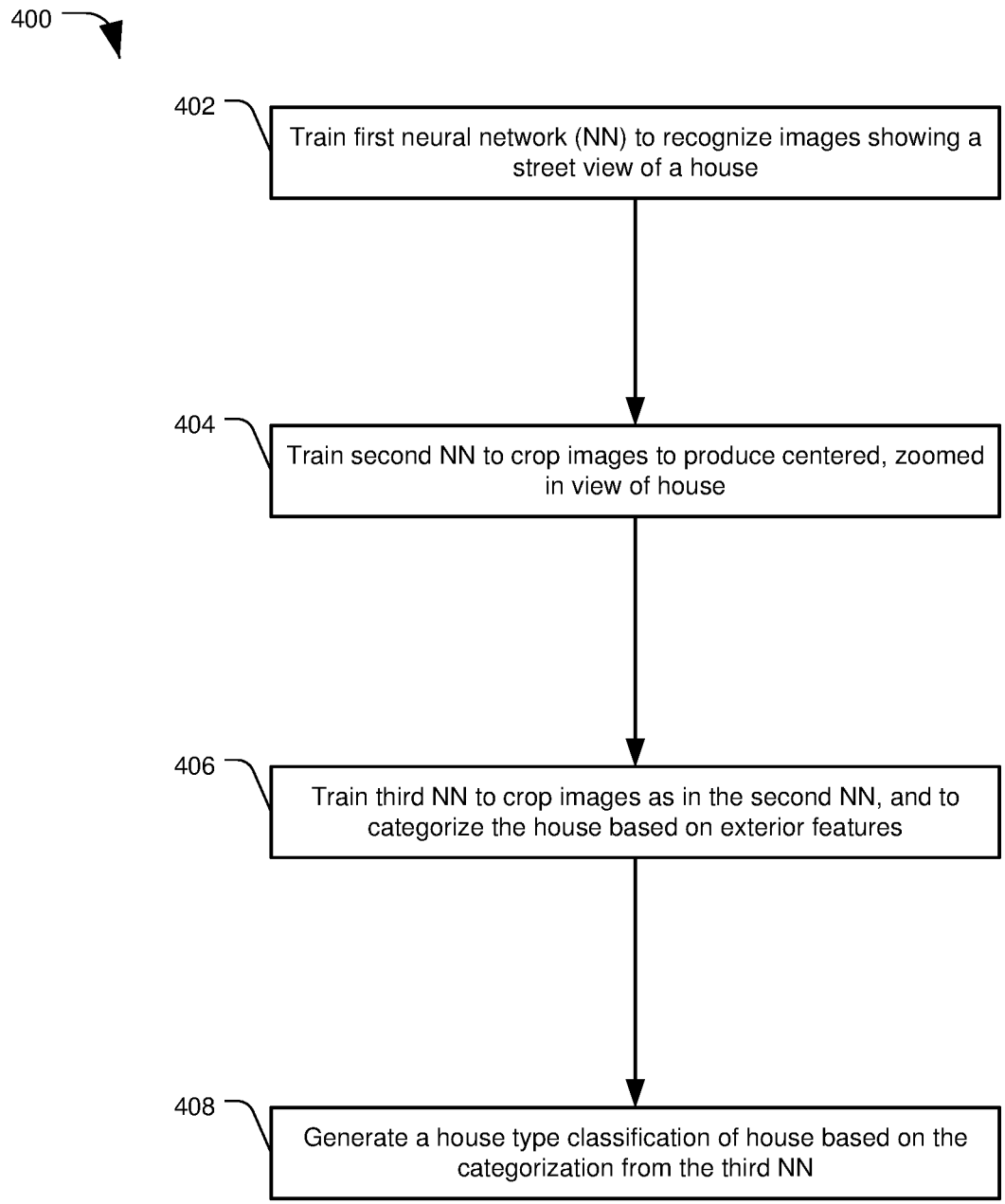
FIG. 4 depicts a flowchart of an example method for computer vision property evaluation, in accordance with certain embodiments of the present disclosure.

FIG. 4 depicts a flowchart 400 of an example method for computer vision property evaluation, in accordance with certain embodiments of the present disclosure. In particular, flowchart 400 provides an example process for training and applying computer vision-based neural networks to crop and potentially evaluate street-view images of buildings. The method of FIG. 4 may be implemented via systems and computing devices such as those depicted in FIG. 2 and FIG. 10.

Street photos of properties are sometimes taken too wide, off-center, or with the property obscured by other objects such as trees, bushes, or vehicles. For example, a vehicle-mounted camera moving through a neighborhood may generate street-view images of properties all throughout the neighborhood, but some of the images may be unsuitable for property listings or targeted advertising in their original state. A custom trained object detector may be taught to recognize images of properties, and to crop the photos to better focus on the property of interest, or reject the image if the property of interest is not sufficiently visible. In some examples, the cropped images may be used to classify the property.

At 402, the method may include training a first NN to recognize images showing a street view of a house or other property. For example, images may be provided from an automated photographing process (e.g., with a camera on a vehicle moving through a neighborhood or other district), or manually-taken photographs of a building exterior. The first NN may be trained to recognize "good" property photos, which may include photos in which the property is clear (e.g., not blurry), wholly within the image, and in which a sufficient amount of the house exterior is visible (e.g., not obscured by objects). An image in which the subject property is too far away, or is shot from too great of a side angle may also prohibit classification as an acceptable image. The first NN may recognize good images based on comparing identified criteria to thresholds (e.g., a proportion of the property within the image), or the classification as a good image may be based on whether the first NN is able to recognize the image as including a property based on the training images. The first NN may be configured or trained to discard images that do not qualify as good images, and to keep images that do qualify as selected images.

A second NN may be trained to crop selected images to produce centered, zoomed-in images of the house or property, at 404. The second NN may be trained to generate images in which the subject property fills a selected portion of the total image (e.g. 60%), with the property centered or positioned in the picture in a desired way. In some examples, the crop may be adjusted based on other characteristics of the original photo. For example, the crop may be adjusted to crop out the top of vehicles, or portions of adjacent properties that would otherwise show up in the picture. Optionally, a single NN may be trained to both recognize images showing a property as described above for NN1, and also to crop the image as described for NN2. In some embodiments, the method may end with the processing of images by the second NN, with it producing cropped and centered images based on user-submitted photos or photos obtained from some other service or source. The cropped images may be used for generating property listings, targeted advertising, or other purposes. In other examples, further processing may be performed.

At 406, the method may include training a third NN to crop images as in the second NN, and to categorize the house or property based on exterior features. For example, the third NN could use the cropped images to determine a general style of architecture, single-story, split-level, or multi-story buildings, or other general features based on training images. The third NN may also be trained to recognize identifying architectural features, property maintenance and upkeep, indications of affluence on the property or neighborhood, or other features. At 408, the method may include generating a house or property classification based on the categorization from the third NN. For example, the classification may estimate a year of construction for the property, whether the property is likely to have been updated, a number of floors, an estimated condition of the property based on exterior paint, a roof condition, or other factors, or other classification details. The property classification may be used for generating property listings, targeted advertising, value estimates for property comparisons, or other applications.

Figure 5:
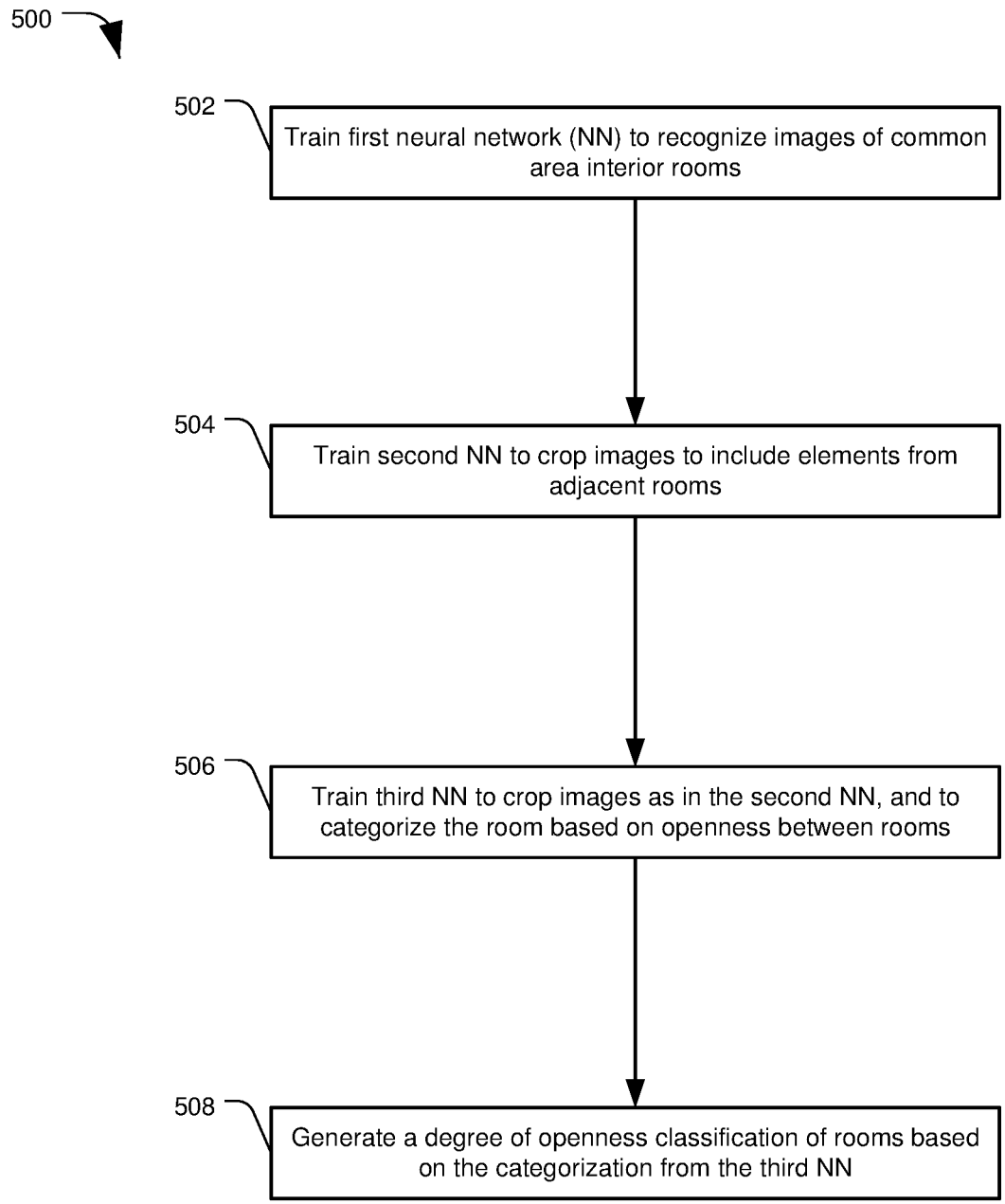
FIG. 5 depicts a flowchart of an example method for computer vision property evaluation, in accordance with certain embodiments of the present disclosure.

FIG. 5 depicts a flowchart 500 of an example method for computer vision property evaluation, in accordance with certain embodiments of the present disclosure. In particular, flowchart 500 provides an example process for training and applying computer vision-based neural networks to quantify a floor plan degree of openness for a property. The method of FIG. 5 may be implemented via systems and computing devices such as those depicted in FIG. 2 and FIG. 10.

Images of common areas of a home or property, such as the kitchen and family room, may be classified and then examined by a convolutional neural net classifier trained on labeled data to determine a degree of openness of the floor plan. For example, multiple images from a property may be evaluated for whether and to what degree walls and other dividing elements split up the common areas.

At 502, the method may include training a first NN to recognize images of common area interior rooms, such as kitchens, dining rooms, and living rooms. A second NN may be trained to crop images of the common areas to include or focus on elements or areas of the photos that show adjacent rooms or pass-through areas between rooms, at 504. For example, certain features indicative of openness may be visible in a kitchen photograph, such as a bar-height counter or island with an opening or view to an adjacent room. Similarly, a photograph of a living room may have elements of a kitchen visible. These openings or adjacent room portions of a photograph may be cropped as a focus, while counters and appliances within a kitchen image may be cropped out, for example.

At 506, the method may include training a third NN to crop images as in the second NN, and to categorize images of the room or rooms based on openness between the rooms. For example, a photo that shows a significant amount of an adjacent room may indicate a very open layout, while images that show minimal or no openness to an adjacent room may indicate a layout that is not open. Categorizations at the third NN may be made per photograph, even if multiple photographs are submitted for a same property.

At 508, a degree of openness classification of rooms may be made based on the categorization(s) from the third NN. A property may receive an openness classification, or individual rooms may be classified. The classification may be based on a single or individual photos, or may be based on a combined evaluation of multiple photographs. For example, if various views are provided from a kitchen and living room of a single property, a classification may be made based on an evaluation of the images with the highest degree of openness categorization, as those images may have been best situated to reflect the openness of the floorplan. The degree of openness classification may be used to generate or populate property listing pages, to generate search results in property searches, or for other applications.

Figure 6:
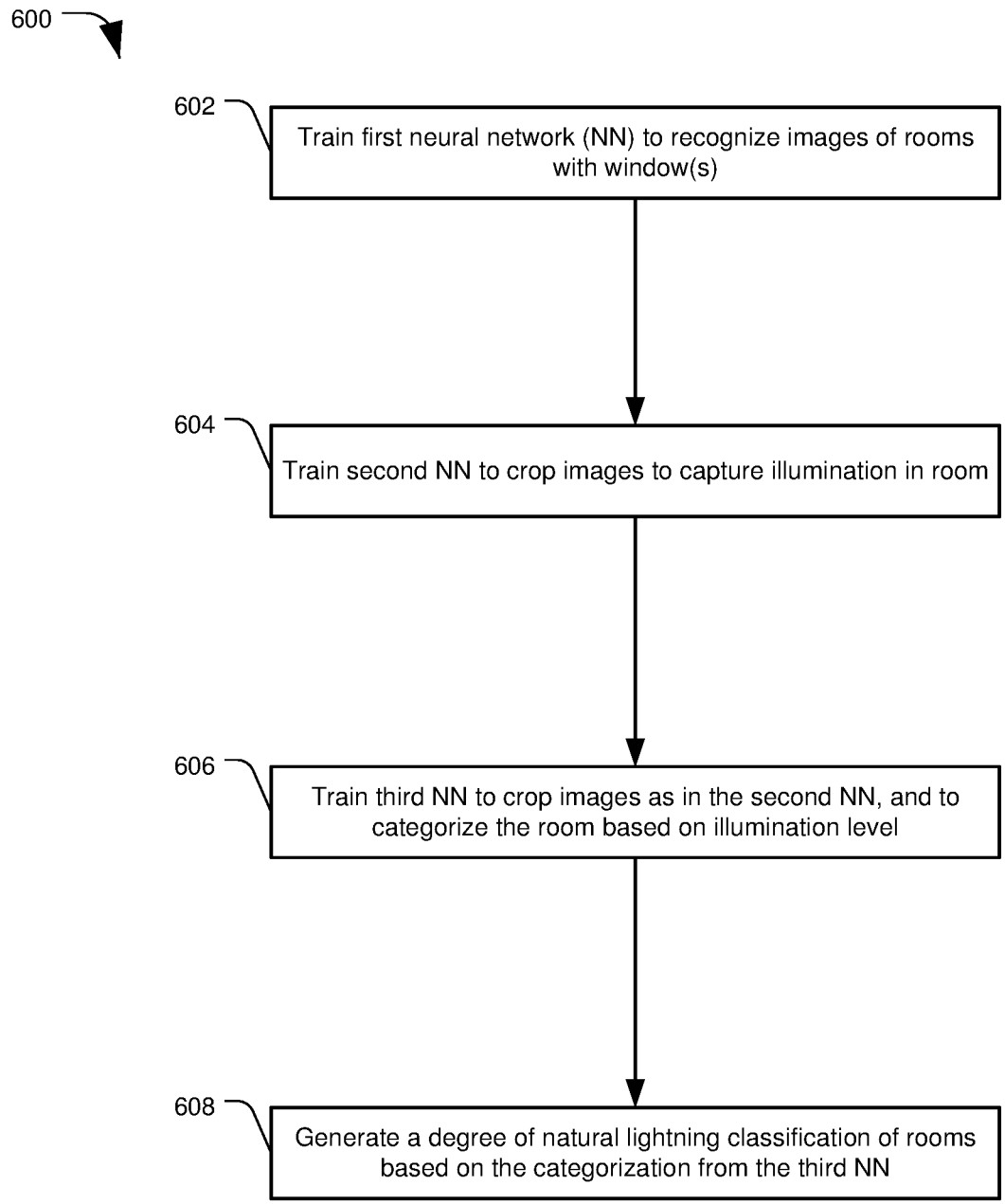
FIG. 6 depicts a flowchart of an example method for computer vision property evaluation, in accordance with certain embodiments of the present disclosure.

FIG. 6 depicts a flowchart 600 of an example method for computer vision property evaluation, in accordance with certain embodiments of the present disclosure. In particular, flowchart 600 provides an example process for training and applying computer vision-based neural networks to quantify a degree of illumination or natural lighting levels in a building. The method of FIG. 6 may be implemented via systems and computing devices such as those depicted in FIG. 2 and FIG. 10.

A combination of image classification using hand-labeled data and object detection to identify windows in photos may be used to infer the amount of lighting in rooms of a building. An aggregate score may be produced that describes how much natural light is available in individual rooms or in the building as a whole.

At 602, a first NN may be trained to recognize images of rooms that may be used to determine an amount of natural lighting available. For example, the first NN may be trained to identify specific rooms, such as a living room, kitchen, or bedroom. The first NN may optionally be trained to specifically identify images that include windows.

A second NN may be trained to crop images to focus on indicators of lighting, or particularly natural lighting, within the image, at 604. For example, the second NN may be trained to crop around windows, glass doors, or patches of natural light cast within a room.

At 606, a third NN may be trained to crop images as in the second NN, and to categorize the room or image based on illumination levels or indicators. For example, the third NN may categorize an image according to a brightness level of the image or walls and floor of the room, based on a comparison of the image as a whole to training images, based on a size or number of windows in the image (e.g. floor-length vs short windows, how much of a wall a window occupies, etc), based on an evaluation of how much light may be received from a window (e.g. if the window appears to face a nearby wall or plant growth, it may provide less natural lightning than an unobscured window), or based on other factors.

At 608, the method may include generating a degree of natural lightning classification for one or more rooms based on the categorization from the third NN. For example, multiple images of a same room may have been categorized by the third NN, and an aggregate natural lighting classification may be generated based on the multiple images. A classification of a natural lighting level may be generated based on the categorization of how obstructed windows are, based on window size and number, and based on other factors. In some examples, a direction windows are facing can be evaluated, either based on the view observed from the window or based on additional data supplied with the photograph(s), and classifying a lighting level may be based on which direction the windows face. An overall natural lighting classification for a building or home may be generated based on the classification of individual photos or rooms of the building. The natural lighting classification may be used to generate or populate property listing pages, to generate search results in property searches, or for other applications.

Figure 7:
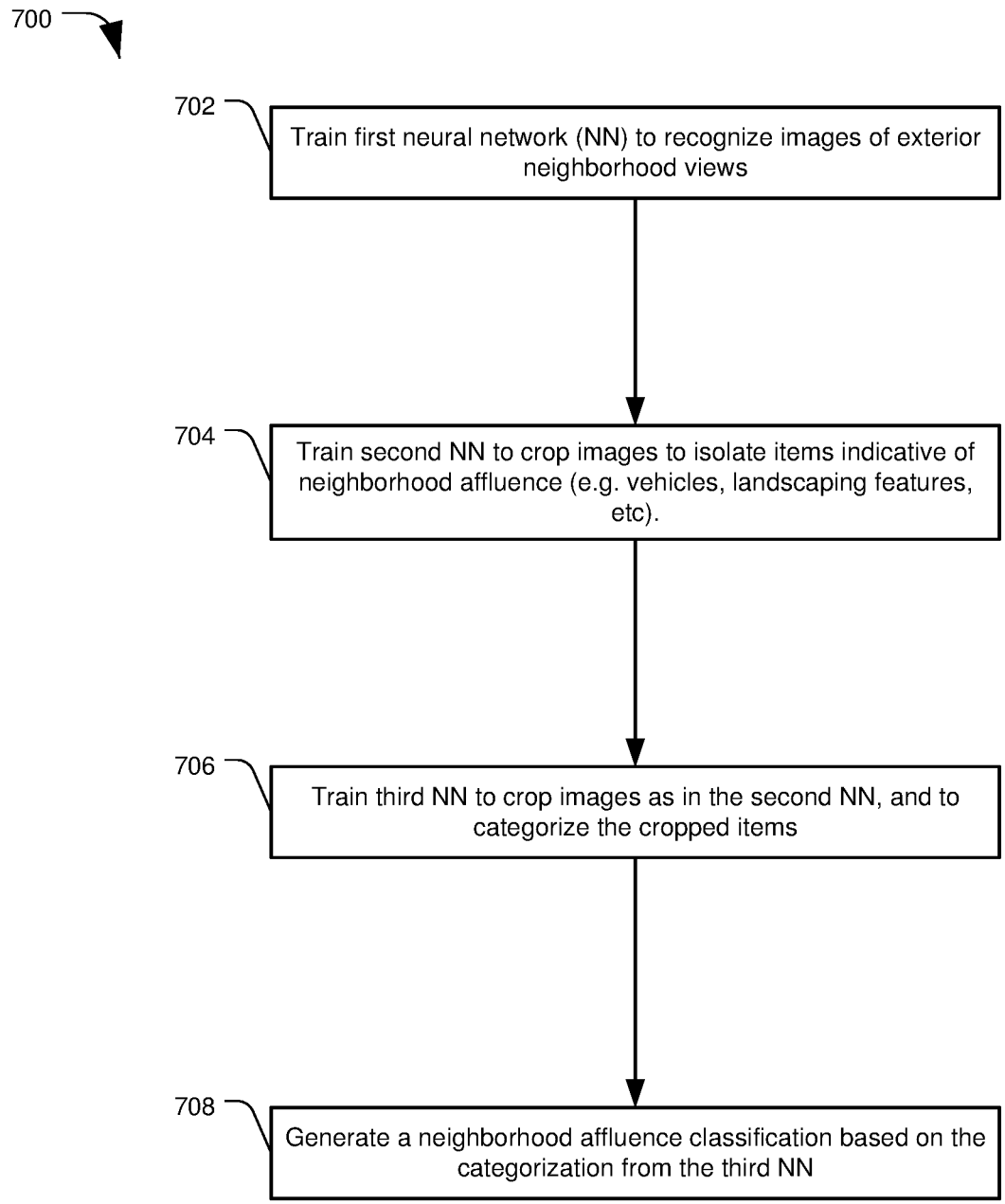
FIG. 7 depicts a flowchart of an example method for computer vision property evaluation, in accordance with certain embodiments of the present disclosure.

Turning now to FIG. 7, a flowchart 700 of an example method for computer vision property evaluation is shown, in accordance with certain embodiments of the present disclosure. In particular, flowchart 700 provides an example process for training and applying computer vision-based neural networks to quantify a neighborhood upkeep or affluence level. The method of FIG. 7 may be implemented via systems and computing devices such as those depicted in FIG. 2 and FIG. 10.

Exterior and street-level photographs may be used in conjunction with a convolutional neural net object detector and classifier to learn to recognize signs of affluence in a neighborhood, such as car makes and years. Additionally, indicators such as garbage, landscaping, yard and fence upkeep, or similar factors can be used to produce a cleanliness or affluence score.

At 702, the method may include training a first NN to recognize images of exterior neighborhood views. The exterior images may include one or more street-view images, such as obtained from a vehicle-mounted camera, or individual photographs taken by users. At 704, a second NN may be trained to crop images to isolate items or scenes indicative of neighborhood affluence or cleanliness, such as vehicles, landscaping features (e.g., trimmed shrubberies, defined garden beds, or other features), architecture and buildings, garbage, etc.

A third NN may be trained to crop images as in the second NN, and to categorize the cropped items, at 706. For example, the third NN may be trained to categorize images as a whole based on similarity to training images, or trained to recognize and categorize specific features such as trash; landscaping, or well-maintained or poorly-maintained yards and fencing; a dilapidated or well-maintained state of buildings; architectural features such as columns, eave brackets, scrollwork, etc.; cars by model and year, or similarly categorize items. At 708, the method may include generating a neighborhood affluence or cleanliness classification based on the categorization from the third NN. Individual images may be classified, for example based on whether a car model and year indicate high or low affluence, based on landscaping features (quality landscaping indicative of cleanliness or affluence), based on the existence or absence of garbage, etc. In some examples, a classification can be made for a neighborhood based on a set or multiple images. For example, a set of street-level images for a same geographical region (e.g., obtained from a database of street-level images taken from a vehicle driving through a neighborhood) may be classified, and an overall neighborhood affluence or cleanliness classification can be generated based on the aggregate classifications of the set of photos. The affluence or cleanliness classification may be used to generate or populate property listing pages, to generate property value estimates, to generate search results in property searches, or for other applications.

Figure 8:
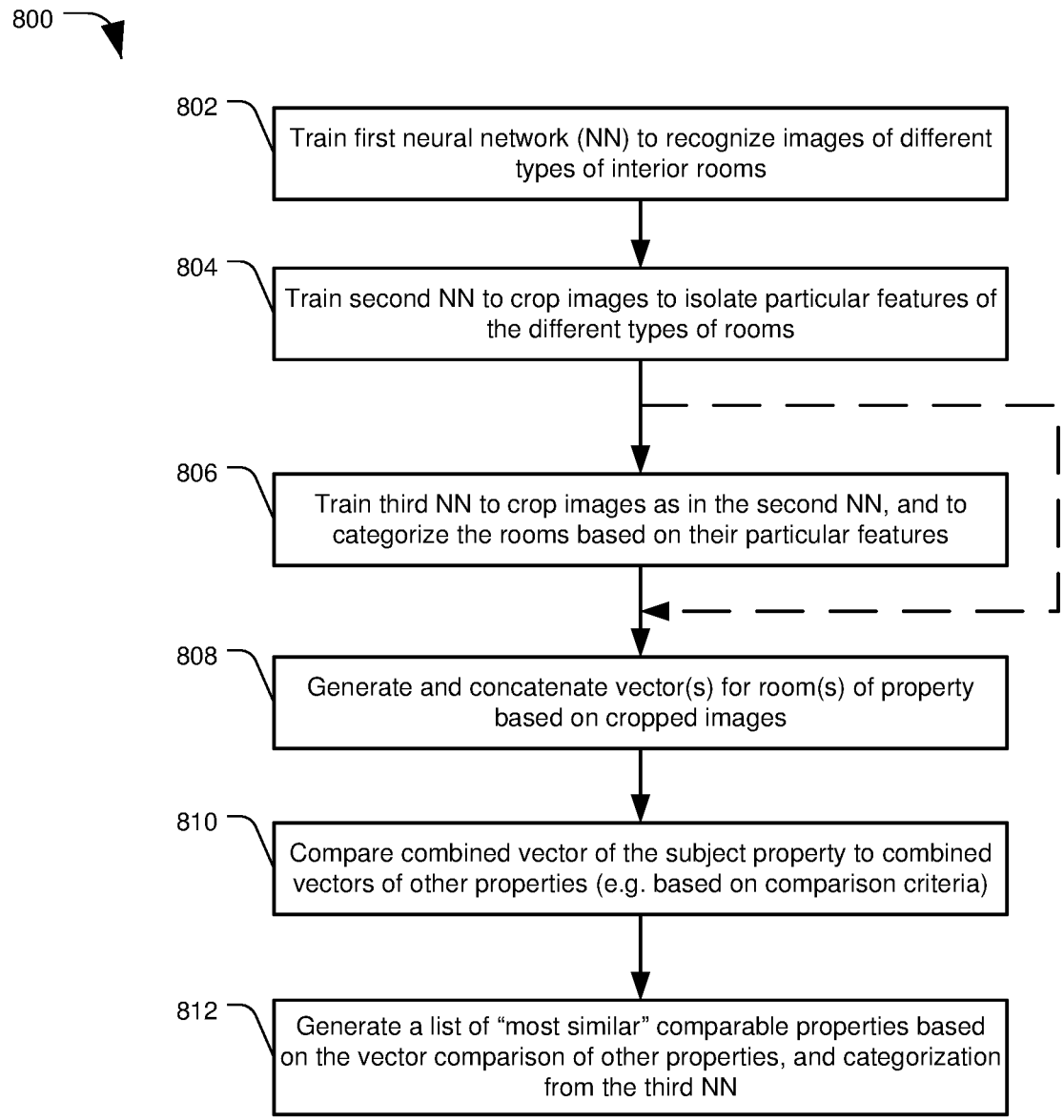
FIG. 8 depicts a flowchart of an example method for computer vision property evaluation, in accordance with certain embodiments of the present disclosure.

FIG. 8 depicts a flowchart 800 of an example method for computer vision property evaluation, in accordance with certain embodiments of the present disclosure. In particular, flowchart 800 provides an example process for training and applying computer vision-based neural networks to determine similar or comparable properties. The method of FIG. 8 may be implemented via systems and computing devices such as those depicted in FIG. 2 and FIG. 10.

Transfer learning from a trained convolutional neural net can be used to featurize images of interiors and obtain a vector semantic representation. The images may then be clustered, and nearest neighbor methods can be used to assign similarity scores between two properties based on their interior images. This score can then be used as an input in the selection of the most relevant comparable properties, such as for valuation, property shopping, or other purposes. NNs specifically trained to recognize rooms and property features may produce better clustering and comparison results than NNs trained on generic or other non-property image data.

The method may include training a first NN to recognize images of different types of interior rooms, at 802. At 804, a second NN can be trained to crop images to isolate particular features of the different types of rooms, such as kitchen or bathroom cabinetry and fixtures, lighting, architectural details, flooring, or other elements. In some examples, the method may include training a third NN to crop images as in the second NN, and to categorize the rooms based on comparable training images, or based on particular features of the rooms (e.g. by categorizing types or styles of plumbing fixtures, cabinets, lightning, architecture, flooring, etc.), at 806.

At 808, the method may include generating and concatenating one or more vectors for rooms of the property based on the cropped images. Vectors may refer to data objects that can represent something, such as images or the depicted rooms or properties themselves, in vector space. Each vector may be a set of identifiers, such as values or variables. For an n-dimensional vector space, vectors within the space may have n features. An example 7-dimensional vector space for houses could have dimensions: kitchen_cabinet_style, bathroom_cabinet_style, floor_style, number_of_rooms, sale_price, construction_date, zip_code. In the case of images for a room, the dimensions of a vector may relate to the details of an image recognized at various layers of a convolutional neural network, rather than particular specific features of a property. Vectors may be generated from the cropped room images, and potentially based on categorizations made about the images. For example, a cropped image may be represented as a 4000 float vector (e.g., a vector having 4000 floating-point variable elements) as a semantic representation of the image. The vector may contain enough information to describe features about how the image looks or what it contains. As in the example above, a vector may be generated based on detected objects, and potentially the condition, style, or other features of the objects, for use in clustering and searching. Another method to generate a vector may be to take a neural net trained on visual tasks such as object detection, then "chop off" or exclude its top or final layer (e.g., the one that decides whether this is a stove or a microwave, or a undermount sink). The output of the layer below, which may be 1024 or 2048 float value vectors for example, may be used as the feature vector to cluster by. This method may generate a vector that represents a semantic representation of the image, in a way that just taking pixel values may not.

In some examples, vectors for multiple rooms or images of a same property can be grouped or combined (e.g., concatenated) to generate one or more vectors for the property as a whole. In some examples, information about the property obtained outside the images (e.g., address, square footage, etc.) can be incorporated into vectors for a property.

At 810, the method may include comparing one or more vectors of the subject property to vectors of other properties, for example based on comparison criteria. Clustering and property similarity evaluations can be performed based on the vectors. A distance algorithm, such as cosine similarity, may be used to compare vectors to determine "most similar" properties to the subject property. Details about the property, such as location and size, may be used in determining most similar properties, by either incorporating those details into the vectors or as a separate step to further identify most similar properties. In some examples, photos for each property entered into a property database may undergo a process to generate one or more combined vectors, which vectors may be stored as details for the property. Those vector values may be retrieved and used to find "most similar" properties to a subject property.

At 812, the method may include generating a list of "most similar" comparable properties based on the vector comparison with other properties, and potentially based on categorization of elements in the images from the third NN. The list of most similar properties may show properties having similarities in décor, finish, architecture, size, value, location, or other considerations. The most similar property list may be used for property valuation or appraisal estimates, property shopping, comparing design or decorating choices, or for other purposes.

Figure 9:
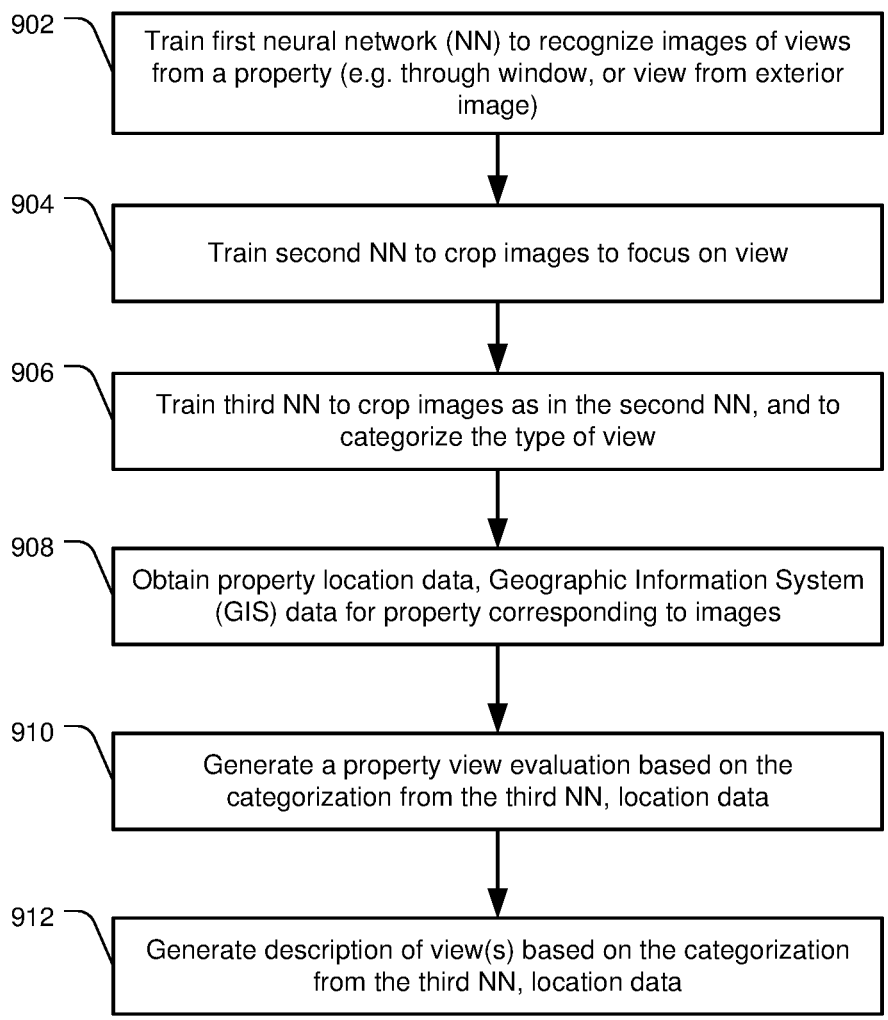
FIG. 9 depicts a flowchart of an example method for computer vision property evaluation, in accordance with certain embodiments of the present disclosure.

FIG. 9 depicts a flowchart 900 of an example method for computer vision property evaluation, in accordance with certain embodiments of the present disclosure. In particular, flowchart 900 provides an example process for training and applying computer vision-based neural networks to evaluate a view available from a property. The method of FIG. 9 may be implemented via systems and computing devices such as those depicted in FIG. 2 and FIG. 10.

Images depicting a view from a property may be recognized from street-level photographs as well as interior photographs via windows. These images may be classified using a convolutional neural net into multiple types or categories of views such as "keyhole, zoomed-in view," "view from yard only," "view from upper floor only," "full view". Further, view images may be used to classify what's visible in the view, giving each property a description of its views from various windows. For example, a determination may be made that five windows point towards the wall of another house; three windows point toward yard; two windows point to the road. Other determinations may be made that the views include a fence, a wooded area, other homes, a lake or pond, mountains, or high-elevation views over lower-elevation land. Image data may be augmented with GIS altitude and topography information to produce a likelihood of good views for the property.

At 902, the method may include training a first NN to recognize images of views from a property, such as by recognizing exterior view images (e.g., photos taken from a yard that include at least a portion of the view that would be visible from the property), recognizing windows in interior images, or recognizing portions of a view visible through windows of interior images. The method may include training a second NN to crop images to focus on the identified view, at 904.

At 906, the method may include training a third NN to crop images as in the second NN, and to categorize the type of view. Categorizations may include what type of scenery is visible (e.g. neighboring homes, woodlands, mountains, water, etc.), where the views are visible from (e.g., from window, from an upper floor only, from a yard), or a nature of the view (e.g., a full unobstructed view, a "keyhole" view that may only show a portion of a view due to obstructions, etc.). For example, characteristics of an image (or in some examples, metadata or externally provided data) may indicate GPS coordinates where the picture was taken, or what zoom level an image was taken at, to indicate whether the view depicted in the image is distant or hard to see from the property. Reflections, dust, or hashing from a window screen in the image may indicate a photo was taken through a window rather being an exterior shot. Other categorizations are also possible.

The method may include obtaining property location data, geographic information system (GIS) data, or similar locational or geographical data for the property corresponding to the images, at 908. For example, location information may be obtained as metadata from the photos (e.g. GPS coordinates obtained by the phone or camera when the picture was taken and included in the image metadata), user-submitted address information, details about the property such as elevation, location, etc. retrieved through a GIS API, or from other sources.

At 910, the method may include generating a property view evaluation based on the categorization from the third NN, and the location data. For example, the method may include comparing an elevation of the subject property to nearby elevations to determine whether the property is likely to have an unobstructed view of the area. The proximity of the property or building to other parcels, buildings, roads, etc. may indicate whether views may be of nearby buildings, parking lots, and so on. The location information may be compared and combined with the categorizations from the third NN to estimate and evaluate a likelihood or quality of a view from the property. The view evaluation may be a simple "good view" or "poor view" determination, a likelihood evaluation (e.g., 70% likely to have a good view), or similar conclusions. This view evaluation may be added to property listings, used for valuation purposes, house or property searches, or other applications.

At 912, the method may include generating a description of views based on the categorization from the third NN and the location data. Rather than or in addition to generating a determination of a likelihood or quality of a view, the method may include using the computer vision evaluation and location data to predict what the view(s) from a property may be. For example, estimating a number of windows facing another house, a number of windows looking over the yard, etc., or whether views are of mountains, valleys, forests, rivers, ponds or lakes, city skylines, etc. These view descriptions may likewise be added to property listings, used for valuation purposes, appraisal software, house or property searches, or other applications. An example computing system used to perform computer vision property evaluation, as in the examples discussed herein, is described in regard to FIG. 10.

Figure 10:
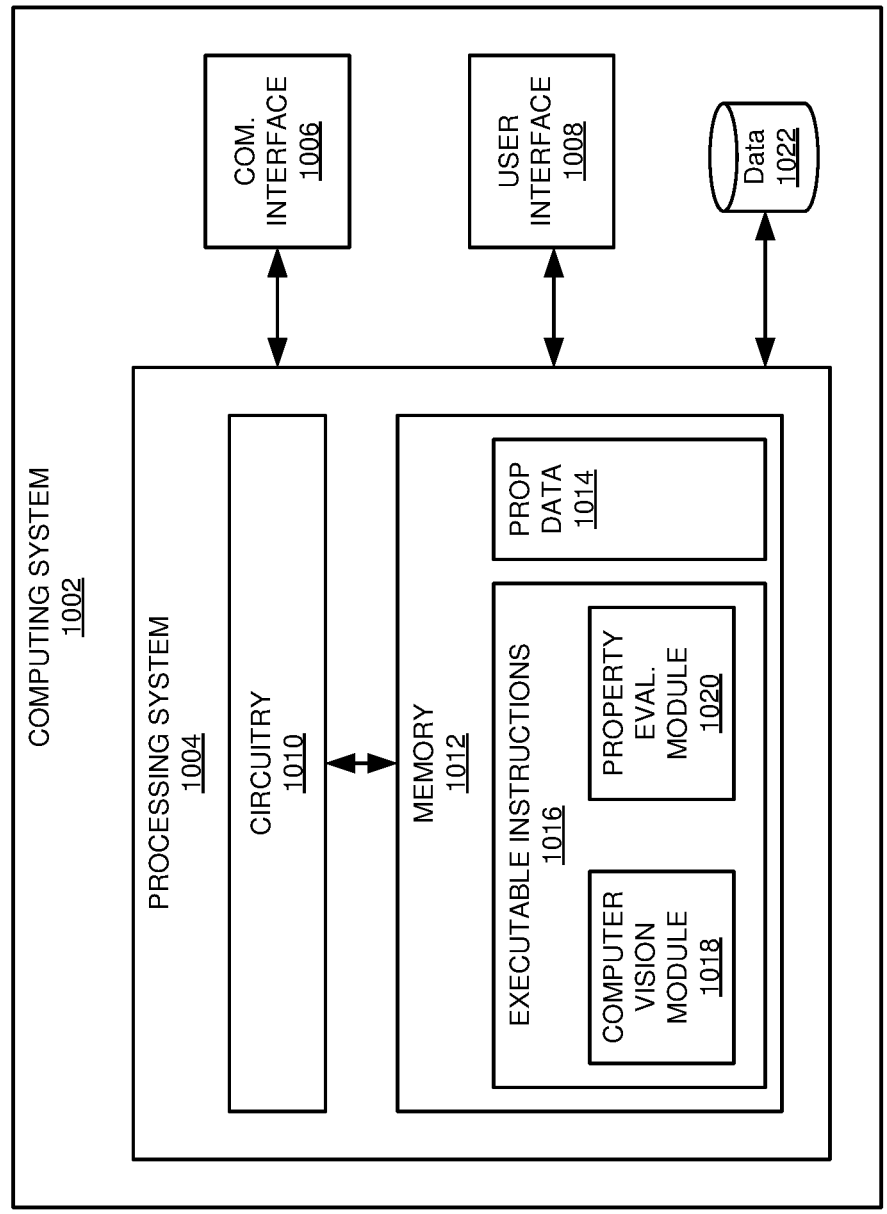
FIG. 10 is a diagram of a system configured for computer vision property evaluation, in accordance with certain embodiments of the present disclosure.

FIG. 10 is a diagram of a system 1000 configured for computer vision property evaluation, in accordance with certain embodiments of the present disclosure. In particular, FIG. 10 depicts a computer system 1002, which may be an example of any computing system that is configured to perform the operations of FIG. 2's user front-end 202, back-end server 204, or cloud infrastructure 206, and related processes and methods. Computing system 1002 may include a processing system 1004, a communication interface 1006, a user interface 1008, and a data storage system 1022. Computing system 1002 may include other components such as a power source and enclosure that are not shown for clarity. Computing system 1002 may comprise one or more server computing systems, desktop computing systems, laptop computing systems, smartphone devices, or any other computing system, including combinations thereof.

Communication interface 1006 may comprise components, such as transceivers, that communicate over communication links, such as network cards, ports, radio frequency (RF), processing circuitry and software, or any other communication devices. Communication interface 1006 may be configured to communicate over metallic, wireless, or optical links. Communication interface 1006 may be configured to use Time Division Multiplex (TDM), Internet Protocol (IP), Ethernet, optical networking, wireless protocols, communication signaling, other communication formats, or any combinations thereof. In particular, communication interface 1006 may be configured enable communications over a network between user front-end 202, back-end server 204, and cloud infrastructure 206.

User interface 1008 may comprise components that can receive user inputs and present media or other information to a user. User interface 1008 may include a display screen, touch screen, touch pad, keyboard, buttons, speaker, microphone, pointer device or interface, communication port, other user input/output apparatus, or any combination thereof.

Data storage system 1022 may include any combination of nonvolatile and volatile memory, such as one or more hard disk drives, NAND solid-state memory, DRAM (dynamic random access memory), or other memory system. Data storage system 1022 may include internal processors or controllers for performing data storage and retrieval operations based on commands received from processing system 1004.

Processing system 1004 may be linked to communication interface 1006, user interface 1008, and data storage system 1022. Processing system 1004 can include processing circuitry 1010 and memory device 1012. Memory device 1012 can store executable instructions or other operating software 1016, and property data 1014, such as address information, geographical information, building details such as square footage, floorplans, etc., or other property information.

Processing circuitry 1010 may comprise a microprocessor and other circuitry that can retrieve and execute instructions 1016 from memory device 1012. Memory 1012 may comprise a non-volatile data storage medium, such as a disk drive or solid state drive, or volatile memory such as random access memories (RAM) and dynamic RAM (DRAM), including combinations thereof. Some data or programs may be loaded from data storage system 1022 into memory 1012 based on instructions from processing system 1004. Data or instructions may also be loaded into memory 1012 from communication interface 1006 or user interface 1008. Processing circuitry 1010 may be mounted on a circuit board that may also hold memory device 1012 and portions of communication interface 1006, user interface 1008, and data storage system 1022.

Executable instructions 1016 may comprise computer programs, firmware, or some other form of machine-readable processing instructions. Executable instructions 1016 may include computer vision module 1018, and property evaluation module 1020, although related operations may be handled by multiple different modules or programs, and additional or different modules may be included in executable instructions 1016. Executable instructions 1016 may further include an operating system, utilities, drivers, network interfaces, applications, or other types of software. When executed by processing circuitry 1010, executable instructions 1016 may direct processing system 1004 to operate computing system 1002 as described herein.

Computer vision module 1018 may be a set of instructions for training and applying computer vision-based machine learning and neural network algorithms to property images, in order to recognize, crop, and categorize property features and details. The computer vision module 1018 may include the NN algorithms and systems themselves, or instructions and systems for interfacing with remote NNs via communication interface 1006. Computer vision module 1018 may also include instructions and algorithms for training the NNs on labeled or cultivated image sets, or utilizing already-trained NNs to process and evaluate property images. In some examples, the computer vision module 1018 may be configured to receive and process images (either labeled or selected training images, or new or raw images) from data storage 1022, from user interface 1008 (e.g., from a local user front-end 204), or from communication interface 1006 (e.g., from databases or resources of cloud infrastructure 206, or from a remote user front-end 204). The computer vision module 1018 may process images via NNs to generate outputs including cropped images and categorizations of scenes within images, which in some embodiments may be stored as property data 1014 or to data storage 1022, or provided to property evaluation module 1020.

Property evaluation module 1020 may be configured to generate property evaluations and classifications based on outputs from NNs and additional property data 1014. Property evaluation module 1020 may be configured to consider classifications of multiple different images correlating to the same property, or to factor in information such as geographical data, in reaching conclusions and evaluations on a property or image. For example, a set of kitchen images from a selected property provided to computer vision module 1018 may result in a set of classifications identifying a style of cabinets, a style of appliances, and a style of plumbing fixtures, which the property evaluation module 1020 may consider when generating an evaluation of how modern or updated the kitchen or property is. In another example, the NNs may produce classifications of views available from a property, and the property evaluation module 1020 may combine those classification with altitude and geographical information from property data 1014 to evaluate a view from the subject property. The property evaluation module 1020 may generate evaluations by comparing image classifications and property data 1014 to databases or lookup tables that correlate image results with property evaluation conclusions, in some embodiments. The property evaluation module 1020 may use algorithms or computer processes to consider and weigh multiple image classifications, for example by determining a natural lightning level in a room based on classifications of six images of a living room, when only two of the images depict a window. The property evaluation module 1020 may work with the NNs to produce some outputs. For example, the property evaluation module 1020 may generate vectors from cropped images, and then use the vectors for property evaluation and comparison. The property evaluation module 1020 may compare results of a current property to stored results for other properties (e.g., stored vector values used to determine a set of most similar properties), including retrieving data on the current or other properties from data storage 1022, from cloud infrastructure 206 via communication interface 1006, or from a user via user interface 1008. The property evaluation module 1020 may also store evaluation results to local storage 1022 or remote storage via communication interface 1006, provide results for review via user interface 1008, or update property listings to include the evaluations, such as by updating databases in cloud infrastructure 206 via communication interface 1006.

Property data 1014 may represent data about a current selected property for evaluation, or about other properties used for comparison. Property data may include address, neighborhood, or zip code information; number of rooms; square footage; room or property layout, orientation, or facing; valuation or sales data; coordinates; elevation; other property data, or any combination thereof. The property data 1014 may be obtained from any source, including data storage 1022, user interface 1008, or from various sources via communication interface 1006, including remote user front-ends 202, MLS servers 214, or GIS server 216.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   executing a computer vision property evaluation operation via a computing system, including:
   identifying an image as having a selected property feature using a first neural network (NN) of the computing system;
   cropping the image of the selected property feature in a selected way to produce a cropped image using a second NN of the computing system;
   generating a categorization of the cropped image by determining which of several categories the cropped image belongs to based on identified details of the selected property feature; and
   generating a classification of a property corresponding to the selected property feature based on the categorization, the classification specifying a qualitative description of the property.

2. The method of claim 1 further comprising:
   cropping the image of the selected property feature in the selected way using a third NN of the computing system; and
   performing the categorizing of the cropped image using the second NN.

3. The method of claim 2 further comprising:
   training the first NN to identify images of the selected property feature using labeled image sets;
   training the third NN to crop images of the selected property feature in the selected way using sample images; and
   training the second NN to crop images of the selected property feature based on output from the third NN, and to categorize the images of the selected property feature based on the identified details.

4. The method of claim 3 further comprising:
   generating a set of images of the selected property feature using the first NN; and
   providing the set of images to the third NN for cropping in the selected way.

5. The method of claim 4 further comprising:
   generating a set of cropped images using the third NN;
   labeling the cropped images to produce labeled cropped images; and
   training the second NN based on the labeled cropped images.

6. The method of claim 1 further comprising:
   obtaining property details regarding the property corresponding to the selected property feature from a source external to the computing system; and
   generating the classification based on the categorization and the property details.

7. The method of claim 6 further comprising:
   obtaining the property details includes receiving the property details from a user front-end interface; and
   presenting the classification via the user front-end interface.

8. The method of claim 6 further comprising:
   the property details include geographical location information of the property corresponding to the selected property feature.

9. A memory device storing instructions that, when executed, cause a processor to:
   execute a computer vision property evaluation operation via a computing system, including:
   identify an image as having a selected property feature using a first neural network (NN) of the computing system;
   crop the image of the selected property feature in a selected way to produce a cropped image using a second NN of the computing system;
   generate a categorization of the cropped image by determining which of several categories the cropped image belongs to based on identified details of the selected property feature; and
   generate a classification of a property corresponding to the selected property feature based on the categorization, the classification specifying a qualitative description of the property.

10. The memory device of claim 9 storing instructions that, when executed, cause the processor to further:
    crop the image of the selected property feature in the selected way using a third NN of the computing system; and perform the categorization of the cropped image using the second NN.

11. The memory device of claim 10 storing instructions that, when executed, cause the processor to further:
train the first NN to identify images of the selected property feature using labeled image sets;
train the third NN to crop images of the selected property feature in the selected way using sample images; and
train the second NN to crop images of the selected property feature based on output from the third NN, and to categorize the images of the selected property feature based on the identified details.

12. The memory device of claim 9 storing instructions that, when executed, cause the processor to further:
generate a set of images of the selected property feature using the first NN; and
provide the set of images to the second NN for cropping in the selected way.

13. The memory device of claim 9 storing instructions that, when executed, cause the processor to further:
obtain property details regarding the property corresponding to the selected property feature from a source external to the computing system; and
generate the classification based on the categorization and the property details.

14. The memory device of claim 9, wherein:
the selected property feature includes kitchen fixtures;
the selected way to crop includes a crop from a bottom portion of upper cabinets to an upper portion of lower cabinets;
the categorization includes identification of a kitchen fixture style; and
the classification is finish quality of the property corresponding to the selected property feature.

15. The memory device of claim 9, wherein:
the selected property feature includes a window in a room;
the selected way to crop includes a crop to capture illumination in the room;
the categorization includes identification of an illumination level of the room; and
the classification is a degree of natural lighting of the property corresponding to the selected property feature.

16. An apparatus comprising:
a processor; and
a memory device storing instructions that cause the processor to:
identify an image as having a selected property feature using a first neural network (NN);
crop the image of the selected property feature in a selected way to produce a cropped image using a second NN;
generate a categorization of the cropped image by determining which of several categories the cropped image belongs to based on identified details of the selected property feature; and
generate a classification of a property corresponding to the selected property feature based on the categorization, the classification specifying a qualitative description of the property.

17. The apparatus of claim 16, further comprising the processor configured to execute the instructions to:
crop the image of the selected property feature in the selected way using a third NN; and
perform the categorization of the cropped image using the second NN.

18. The apparatus of claim 16, further comprising the processor configured to execute the instructions to:
generate a set of images of the selected property feature using the first NN; and
provide the set of images to the second NN for cropping in the selected way.

19. The apparatus of claim 16, further comprising the processor configured to execute the instructions to:
obtain property details regarding the property corresponding to the selected property feature from a source external to the apparatus; and
generate the classification based on the categorization and the property details.

20. The apparatus of claim 16, wherein:
the selected property feature includes an exterior neighborhood view;
the selected way to crop includes isolating an element indicative of affluence;
the categorization includes identification of the element; and
the classification is affluence level of a neighborhood of the property corresponding to the selected property feature.

* * * * *